UNITED STATES PATENT OFFICE.

HERMANN VIETH, OF LUDWIGSHAFEN, GERMANY, ASSIGNOR TO KNOLL & COMPANY, OF SAME PLACE.

BIACETATE OF ANTHRAPURPURIN AND PROCESS OF MAKING SAME.

SPECIFICATION forming part of Letters Patent No. 678,070, dated July 9, 1901.

Application filed December 8, 1900. Serial No. 39,118. (Specimens.)

*To all whom it may concern:*

Be it known that I, HERMANN VIETH, a subject of the Duke of Anhalt, and a resident of Ludwigshafen-on-the-Rhine, Kingdom of Bavaria, German Empire, have invented a new Chemical Compound—Biacetate of Anthrapurpurin—and Process of Making the Same, of which the following is a specification.

Recent investigation has shown that nearly all drugs used as purgatives contain certain derivatives of oxyanthraquinone as their active principle. I have found that these purgatives may be substituted to advantage by anthrapurpurin compounds having a close relation to the aforesaid oxyanthraquinone-glycosids. Especially the biacetate of anthrapurpurin hitherto unknown has proved to be a very useful purgative, being insoluble in the stomach and exercising a mild action, similar to that of aloes, in the alkaline intestines or bowels.

It has been found that the biacetate will be the suitable form for administering the remedy, which if not changed would prove to be unfit for use on account of the intensive coloring of the urine. The triacetate as described by Perkin is far more difficultly soluble and reacts, therefore, too weakly. The ether of biacetate of anthrapurpurin, hitherto unknown, will be produced by the reaction of the calculated quantity of a means of acetylization on the anthrapurpurin. In using a greater quantity or an excessive quantity of the means of acetylization on the anthrapurpurin this acetylization will proceed or continue up to the triacetate, if care is not taken to allow the excess (the third molecule) of the means of the acetylization to remain without effect, for instance, by the addition of a diluting means or by the maintainance of a lower temperature. The said biacetate of anthrapurpurin is a microcrystalline yellow powder having a fusing-point of 175° to 178° centigrade, insoluble in water, readily soluble in boiling acetic acid and less soluble in alcohol. Caustic and carbonized alkalies will gradually decompose the biacetate, forming a violet-blue solution of anthrapurpurin.

The biacetate of anthrapurpurin, which is the subject of my invention, can be obtained by applying all the commonly-used methods of acetylization upon anthrapurpurin. Hereunder some examples are given.

First. A mixture of five parts of anthrapurpurin and five to six parts of anhydric acetic acid is heated and kept boiling for about two to three hours. Then the mass is allowed to crystallize, the crystals are separated from the liquor, washed by alcohol, and dried. The product may be purified by recrystallization from chloroform or acetic acid. The yield of anthrapurpurin biacetate is almost equal to theory.

Second. Five parts of anthrapurpurin are put together with five parts of acetic chlorid and ten parts of acetic acid, and this mixture is treated as above.

Third. Five parts of anthrapurpurin are put together with ten parts of acetic acid and three parts of oxychlorid of phosphorus, and this mixture is treated as above.

The analysis of the new product (five grams decomposed by fifty cubic centimeters normal alkali) shows the following result:

|   | Obtained. | Calculated. |
|---|---|---|
| Acetic acid: (1) | 1.86 gr. | 1.77 gr. |
| (2) | 1.82 gr. | 1.77 gr. |

The purgative dose is 0.5 to one gram.

What I claim as my invention is—

1. The process for the production of biacetate of anthrapurpurin consisting in treating anthrapurpurin with calculated quantities of acetylizing reagents adapted to produce biacetate of anthrapurpurin, substantially as herein described.

2. The biacetate of anthrapurpurin herein described, acting as a purgative; being a crystalline yellowish powder having a fusing-point of 175° to 178° centigrade, insoluble in water and dilute acids, nearly insoluble in alcohol, soluble in chloroform or hot acetic acid, capable of gradual decomposition by means of caustics and carbonated alkalies.

In testimony that I claim the foregoing as my invention I have signed my name, in presence of two witnesses, this 23d day of November, A. D. 1900.

HERMANN VIETH.

Witnesses:
JACOB ADRIAN,
OSWALD KRUG.